US012066076B2

(12) United States Patent
Gross

(10) Patent No.: US 12,066,076 B2
(45) Date of Patent: Aug. 20, 2024

(54) DAMPER DEVICE

(71) Applicants: THYSSENKRUPP BILSTEIN GMBH, Ennepetal (DE); thyssenkrupp AG, Essen (DE)

(72) Inventor: Manuel Gross, Witten (DE)

(73) Assignees: ThyssenKrupp Bilstein GmbH, Ennepetal (DE); thyssenkrupp AG, Essen (DE)

(*) Notice: Subject to any disclaimer, the term of this patent is extended or adjusted under 35 U.S.C. 154(b) by 678 days.

(21) Appl. No.: 17/270,963

(22) PCT Filed: Aug. 28, 2019

(86) PCT No.: PCT/EP2019/072901
§ 371 (c)(1),
(2) Date: Feb. 24, 2021

(87) PCT Pub. No.: WO2020/048835
PCT Pub. Date: Mar. 12, 2020

(65) Prior Publication Data
US 2021/0254685 A1 Aug. 19, 2021

(30) Foreign Application Priority Data

Sep. 6, 2018 (DE) ...................... 10 2018 215 184.9

(51) Int. Cl.
*F16F 9/32* (2006.01)
*B60G 13/08* (2006.01)
(Continued)

(52) U.S. Cl.
CPC ................ *F16F 9/325* (2013.01); *F16F 9/19* (2013.01); *F16F 9/34* (2013.01); *B60G 13/08* (2013.01);
(Continued)

(58) Field of Classification Search
CPC .... F16F 9/325; F16F 9/348; F16F 9/46; F16F 9/466; F16F 9/062; F16F 9/3207;
(Continued)

(56) References Cited

U.S. PATENT DOCUMENTS 5,375,683 A * 12/1994 Huang ................ F16F 9/096
188/266.8
6,427,986 B1 * 8/2002 Sakai ................ B60G 17/0416
188/282.4
(Continued)

FOREIGN PATENT DOCUMENTS

DE 42 16 987 A 7/1993
DE 198 22 648 A 12/1998
(Continued)

OTHER PUBLICATIONS

English Translation of International Search Report issued in PCT/EP2019/072901, dated Oct. 28, 2019.

*Primary Examiner* — Robert A. Siconolfi
*Assistant Examiner* — San M Aung
(74) *Attorney, Agent, or Firm* — thyssenkrupp North America, LLC

(57) ABSTRACT

A damper device may include a damper tube and a backpack valve arrangement. The damper tube comprises an outer wall with a first passage opening. The backpack valve arrangement may be arranged in a backpack housing, and the backpack housing may have a second passage opening. The first passage opening and the second passage opening may be connected via a first duct of a connecting element. The damper tube may have a main extension axis, and the first and second passage openings may be offset from one another in a direction of the main extension axis. In some
(Continued)

cases the connecting element is non-integral with the damper tube, and the connecting element is non-integral with the backpack housing.

19 Claims, 4 Drawing Sheets

(51) Int. Cl.
    *F16F 9/19*     (2006.01)
    *F16F 9/34*     (2006.01)

(52) U.S. Cl.
    CPC ...... *B60G 2202/24* (2013.01); *B60G 2206/41* (2013.01); *B60G 2800/162* (2013.01); *F16F 2222/12* (2013.01); *F16F 2224/0208* (2013.01); *F16F 2230/0005* (2013.01); *F16F 2232/08* (2013.01); *F16F 2234/02* (2013.01)

(58) Field of Classification Search
    CPC .. F16F 9/34; F16F 9/19; F16F 2222/12; F16F 2224/0208; F16F 2230/0005; F16F 2230/32; F16F 2232/08; F16F 2234/02; B60G 13/08; B60G 2202/24; B60G 2206/41; B60G 2800/162
    USPC .......................................... 188/313
    See application file for complete search history.

(56) References Cited

U.S. PATENT DOCUMENTS

| | | | |
|---|---|---|---|
| 7,017,719 B2 | 3/2006 | Andreas | |
| 2004/0134730 A1* | 7/2004 | Forster | F16F 9/062 188/314 |
| 2009/0032346 A1 | 2/2009 | Nowaczyk | |
| 2011/0042174 A1* | 2/2011 | Hamers | F16F 9/464 188/322.13 |
| 2014/0090941 A1* | 4/2014 | Shibahara | F16F 9/18 188/315 |
| 2015/0300442 A1* | 10/2015 | Schmidt | F16F 9/3207 403/31 |
| 2016/0160955 A1 | 6/2016 | Yu et al. | |
| 2017/0097062 A1 | 4/2017 | Schmidt | |
| 2019/0186582 A1* | 6/2019 | Döbber | F16F 9/325 |

FOREIGN PATENT DOCUMENTS

| | | |
|---|---|---|
| DE | 101 35 252 A | 3/2002 |
| DE | 10 2008 015 412 B | 10/2009 |
| DE | 10 2008 062 162 B | 6/2010 |
| DE | 10 2014 108 027 A | 12/2015 |
| DE | 11 2008 001 980 B | 2/2016 |
| DE | 10 2015 209 177 A | 11/2016 |
| DE | 10 2016 214 672 A | 2/2018 |
| EP | 1 953 394 A | 8/2008 |
| JP | H05 180 259 A | 7/1993 |
| WO | 2014/086713 A | 6/2014 |

* cited by examiner

DAMPER DEVICE

CROSS REFERENCE TO RELATED APPLICATIONS

This application is a U.S. National Stage Entry of International Patent Application Serial Number PCT/EP2019/072901, filed Aug. 28, 2019, which claims priority to German Patent Application No. DE 10 2018 215 184.9, filed Sep. 6, 2018, the entire contents of both of which are incorporated herein by reference.

FIELD

The present disclosure generally relates to dampers, including dampers that include a damper tube and a backpack valve arrangement.

BACKGROUND

Damper devices of this kind that include a damper tube and a backpack valve arrangement are known from the prior art and are used in particular for the vibration damping of vehicles. DE 10 2008 015 412 B4 discloses, for example, a vibration damper having two damping valves with a continuously adjustable damping force, which are arranged in a common backpack housing. The backpack housing is in that case connected via a first bore to a working chamber, remote from the piston rod, of a damper tube and via a second bore to the working chamber, on the piston rod side, of the damper tube. A piston rod is able to move into and out of the damper tube in an oscillating manner.

Thus, a need exists for a damper device comprising a damper tube and a backpack valve arrangement, which is adaptable in an economical manner to the available installation space, for example in vehicles.

DETAILED DESCRIPTION

Figure 1:
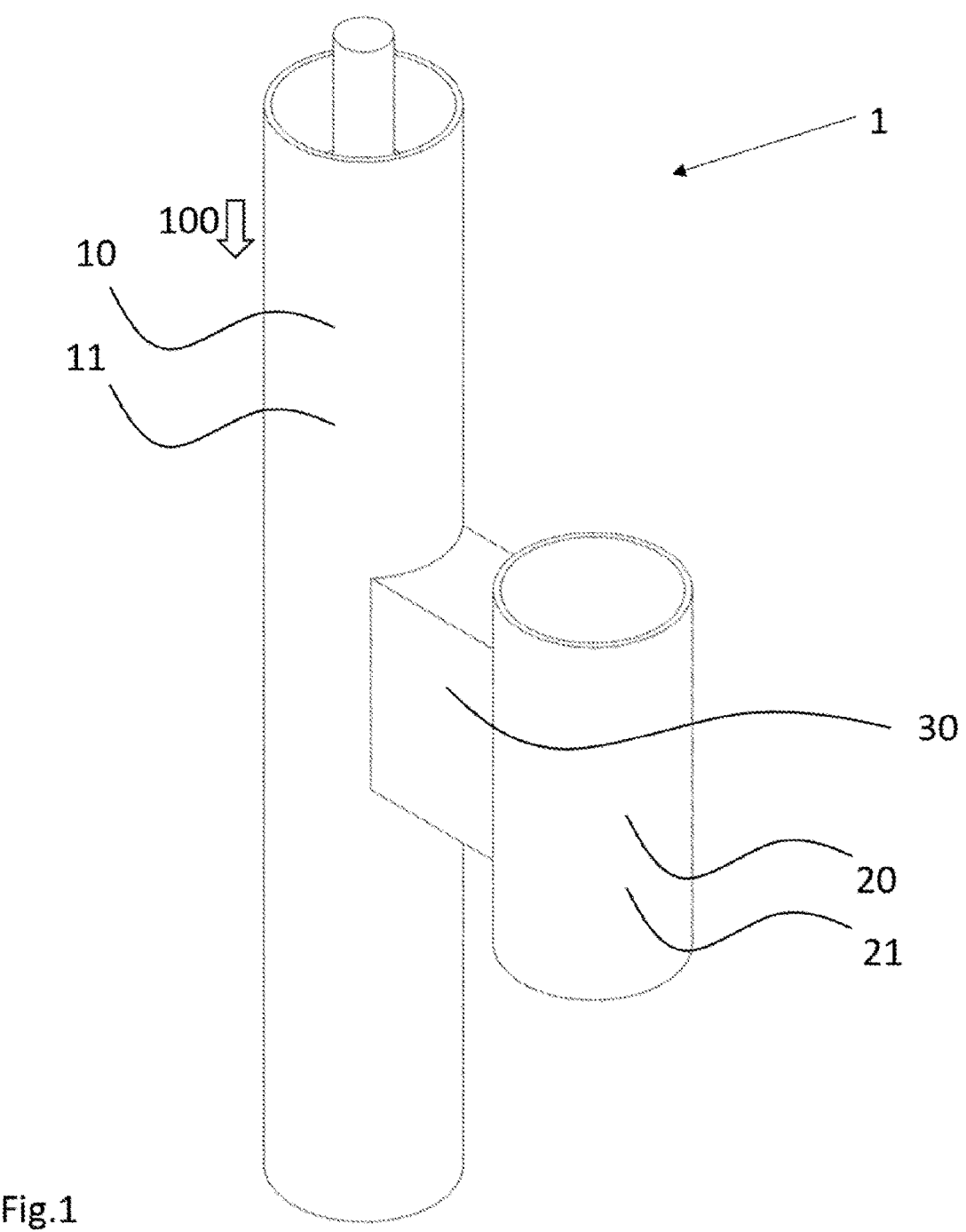
FIG. 1 is a schematic view of an example damper device.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to damper devices comprising a damper tube and a backpack valve arrangement. The damper tube may comprise an outer wall that has a first passage opening. The backpack valve arrangement may be positioned in a backpack housing, and the backpack housing may have a second passage opening.

In some examples, a damper device may comprise a damper tube and a backpack valve arrangement, wherein the damper tube comprises an outer wall, wherein the outer wall has a first passage opening, wherein the backpack valve arrangement is arranged in a backpack housing, wherein the backpack housing has a second passage opening, wherein the first passage opening and the second passage opening are connected with the aid of a first duct of a connecting element.

According to the invention, it is, as a result, possible that, with the aid of the connecting element, there are extended possibilities for the relative spatial arrangement of the damper tube and the backpack housing, without the functionality of the damper device being negatively affected. As a result, it is particularly advantageously possible to adapt a damper device according to the invention to various spatial conditions, with the result that the usability, for example in specific vehicles, is improved or allowed in the first place, in particular when the available installation space is limited. Furthermore, it is particularly advantageously possible that existing damper tubes and backpack housings do not need to be modified/adapted (or only need to be to a minor extent). The connecting element can be for example a module flange or a module flange arrangement. In particular, the damper tube and the backpack housing are connected together via a connecting element. The flow of damping medium between the backpack housing and damper tube can be ensured via the connecting element. According to the invention, it is therefore advantageously possible to provide a connecting element having flow deflection in a damper device.

According to one embodiment of the present invention, the damper tube has a main extension axis, wherein the first passage opening and the second passage opening are arranged in an manner offset from one another in the direction of the main extension axis. As a result, it is possible, according to one embodiment of the present invention, for the first and second passage openings to be spaced apart from one another in the direction of a main extension axis of the damper tube (i.e. preferably a movement axis of the piston). By choosing the relative offset (of the first and second passage openings), it is possible to choose the relative arrangement of the backpack housing with respect to the damper tube along the main extension direction. It is additionally or alternatively conceivable for the first passage opening and the second passage opening to be arranged in an offset manner perpendicularly to the main extension axis of the damper tube. Thus, inclination angles or oblique positions (with respect to the main extension axis) also come into question for the arrangement of the first passage opening and second passage opening, i.e. in particular both an offset in the direction of and perpendicularly to the main extension axis.

However, according to one embodiment of the present invention, it is also conceivable for the first passage opening and second passage opening to be arranged in a manner offset or spaced apart from one another only in the direction of the main extension axis and not to have any offset perpendicularly to the main extension axis. Alternatively, according to one embodiment of the present invention, it is conceivable for the first passage opening and second passage opening to be arranged in a manner offset or spaced apart from one another only perpendicularly to the main extension axis and not to have any offset in the direction of the main extension axis.

According to one embodiment of the present invention, it is conceivable for the central axis of the first duct not to be aligned with the central axis of the first and/or second passage opening.

According to one embodiment of the present invention, the connecting element is formed separately from the damper tube, wherein the connecting element is formed in particular separately from the backpack housing. As a result, according to one embodiment of the present invention, it is possible for the connecting element to be a separate component, such that a pre-existing damper tube (and in particular a pre-existing backpack housing) can advantageously be used, with it still being possible to adapt the damper device to the available installation space. Thus, the advantages of the invention can be achieved in a particularly economical manner.

According to one embodiment of the present invention, the outer wall has a further first passage opening, wherein the backpack housing has a further second passage opening, wherein the further first passage opening and the further second passage opening are connected with the aid of a second duct of the connecting element. Alternatively, it is also conceivable for a second duct, with the aid of which the further first passage opening and the further second passage opening are connected, to be arranged in a further connecting element (which is not the connecting element).

According to one embodiment of the present invention, the further first passage opening and the further second passage opening are arranged in a manner offset from one another in the direction of the main extension axis of the damper tube. As a result, according to one embodiment of the present invention, it is possible—even when a first duct and a second duct are present—to freely choose the relative arrangement of the backpack housing with respect to the damper tube in the direction of the main extension axis. In particular, it is possible to take a wide variety of (identical or different) spacings between the first passage opening and the further first passage opening and between the second passage opening and the further second passage opening into consideration. It is additionally or alternatively conceivable for the further first passage opening and the further second passage opening to be arranged in an offset manner perpendicularly to the main extension axis of the damper tube. Thus, inclination angles or oblique positions (with respect to the main extension axis) also come into question for the arrangement of the further first passage opening and further second passage opening, i.e. in particular both an offset in the direction of and perpendicularly to the main extension axis.

However, according to one embodiment of the present invention, it is also conceivable for the further first passage opening and the further second passage opening to be arranged in a manner offset or spaced apart from one another only in the direction of the main extension axis and not to have any offset perpendicularly to the main extension axis. Alternatively, according to one embodiment of the present invention, it is conceivable for the further first passage opening and further second passage opening to be arranged in a manner offset or spaced apart from one another only perpendicularly to the main extension axis and not to have any offset in the direction of the main extension axis.

According to one embodiment of the present invention, it is conceivable for the central axis of the second duct not to be aligned with the central axis of the further first and/or further second passage opening.

According to one embodiment of the present invention, the first passage opening and the further first passage opening exhibit a first spacing in the direction of the main extension axis of the damper tube, wherein the second passage opening and the further second passage opening exhibit a second spacing in the direction of the main extension axis of the damper tube, wherein the first spacing and the second spacing are the same size.

According to one embodiment of the present invention, the first duct is configured to deflect a hydraulic flow, wherein in particular the second duct is configured to deflect a further hydraulic flow. As a result, according to one embodiment of the present invention, it is possible for hydraulic flows to be able to pass from the damper tube into the backpack housing (and vice versa) and for the flows at the same time to be able to be deflected in accordance with the spacing of the first and second passage opening (or of the further first and further second passage opening, respectively).

According to one embodiment of the present invention, the first duct has a first end region, wherein the first end region is connected to the first passage opening, wherein the first duct has a second end region, wherein the second end region is connected to the second passage opening, wherein the first end region is formed in a circular manner, wherein the second end region is formed preferably in an oval manner. As a result, according to one embodiment of the present invention, it is possible for an efficient connection between the first duct and the passage openings to be possible. It is also conceivable, however, for the first end region (and/or second end region) to have some other shape.

According to one embodiment of the present invention, the second duct has a further first end region, wherein the further first end region is connected to the further first passage opening, wherein the second duct has a further second end region, wherein the further second end region is connected to the further second passage opening, wherein the further second end region is formed in a circular manner, wherein the further first end region is formed preferably in an oval manner. As a result, according to one embodiment of the present invention, it is possible for an efficient connection between the second duct and the further passage openings to be possible. It is also conceivable, however, for the further first end region (and/or further second end region) to have some other shape.

According to one embodiment of the present invention, the backpack housing comprises a first hydraulic chamber and a second hydraulic chamber, wherein the second passage opening is arranged at the first hydraulic chamber and the further second passage opening is arranged at the second hydraulic chamber.

It is conceivable for various backpack valve arrangements to be arranged in a backpack housing according to one embodiment of the present invention.

Further details, features and advantages of the invention will become apparent from the drawings and from the following description of preferred embodiments with reference to the drawings. The drawings illustrate only exemplary embodiments of the invention, which do not restrict the concept of the invention.

FIG. 1 schematically shows an illustration of a damper device 1 according to one embodiment of the present invention. The damper device 1 comprises in this case a damper tube 10 with an outer wall 11. Arranged in the damper tube 10 is a piston, which subdivides the interior into two working chambers. The piston is in this case typically able to move in and out in an oscillating manner. Furthermore, the damper device 1 comprises a backpack valve arrangement 20, which is arranged in a backpack housing 21. Arranged between the damper tube 10 and the backpack housing 21 is a connecting element 30.

Figure 2:
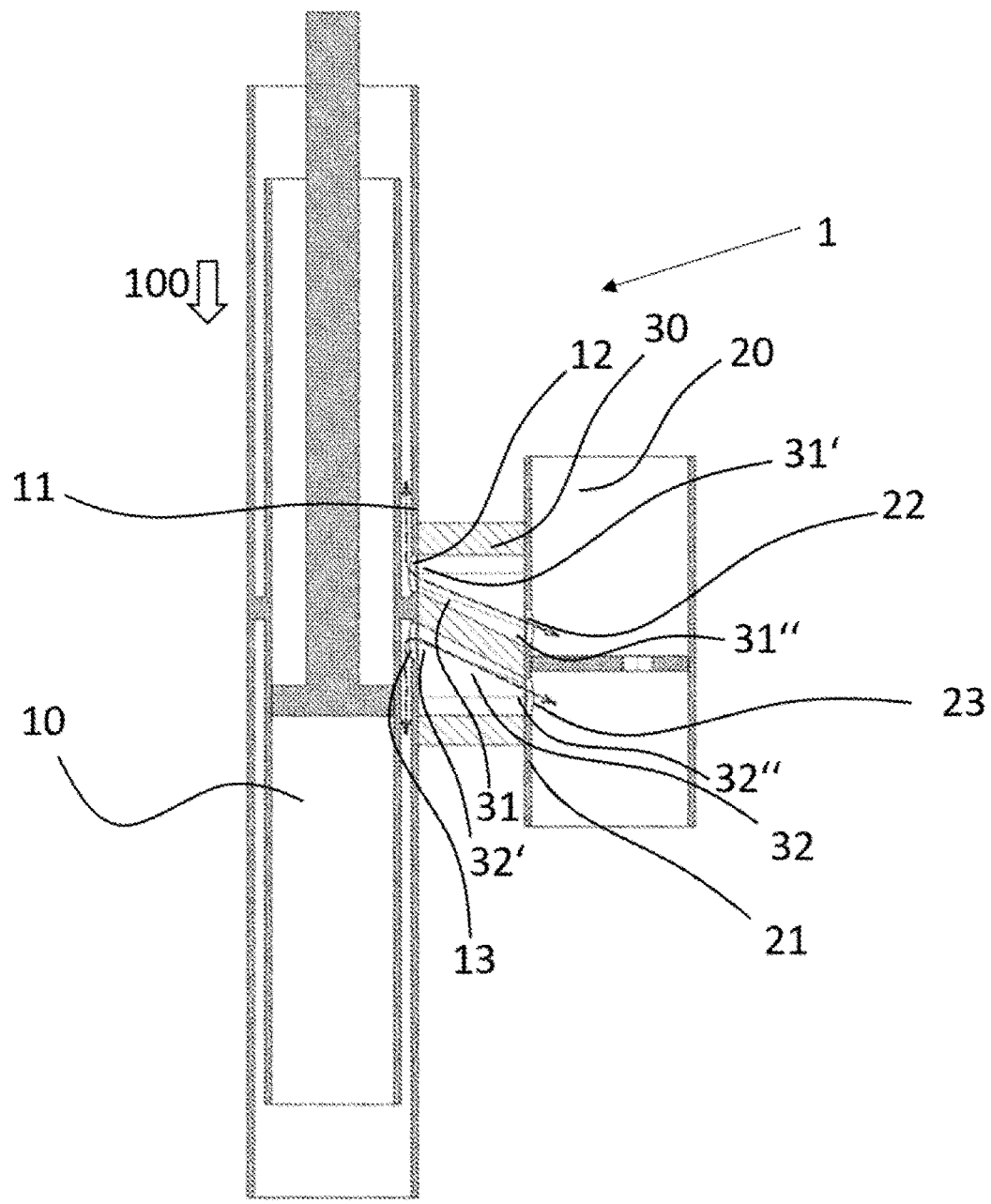
FIG. 2 is a schematic view of another example damper device.

FIG. 2 shows a further schematic illustration of a damper device 1 according to one embodiment of the present invention. The connecting element 30 is arranged between the damper tube 10 and the backpack housing 21. The shape of the connecting element 30, or the wall 33 thereof, is configured such that it can be fitted between the cylindrical damper tube 10 and the cylindrical backpack housing 21. The damper tube 10 comprises a first passage opening 12 in its outer wall 11. Connected to this first passage opening 12 is a first end region 31' of a first duct 31 of the connecting element 30 (for example in the form of a flange connection). The backpack housing 21 comprises a second passage opening 22. A second end region 31" of the first duct 31 is connected to this second passage opening 22 (for example in the form of a flange connection). Therefore, by way of the first duct 31 and the first and second passage openings 12, 22, an (in particular hydraulic) connection is established between a first working chamber of the damper tube 10 and a first hydraulic chamber of the backpack valve 20 or of the backpack housing 21. With the aid of the connecting piece 30, it is in particular possible for the first passage opening 12 and the second passage opening 22 to be spaced apart from one another in the direction of the main extension axis 100 (illustrated by the arrow 100) of the damper tube 10. This would not be possible in the case of a direct connection of the first passage opening 12 and the second passage opening 22 (i.e. in the case of a connection without a connecting element 30). In particular, the first duct 31 is therefore configured to deflect a hydraulic flow (which can flow through it). Furthermore, the damper tube 10 comprises a further first passage opening 13 in its outer wall 11. Connected to this further first passage opening 13 is a further first end region 32' of a second duct 32 of the connecting element 30 (for example in the form of a flange connection). The backpack housing 21 comprises a further second passage opening 23. A further second end region 32" of the second duct 32 is connected to this further second passage opening 23 (for example in the form of a flange connection). Therefore, by way of the second duct 32 and the further first and further second passage openings 13, 23, an (in particular hydraulic) connection is established between a second working chamber of the damper tube 10 and a second hydraulic chamber of the backpack valve 20 or of the backpack housing 21. By way of the connecting element 30 it is therefore likewise possible for the further first passage opening 13 and the further second passage opening 23 to be spaced apart from one another in the direction of the main extension axis 100. This therefore results in a wide variety of possibilities for the relative arrangement of the damper tube 10 and backpack housing 21 with respect to one another, wherein pre-existing damper tubes 10 and backpack housings 21 can be used in a modular manner with connecting elements 30.

Figure 3:
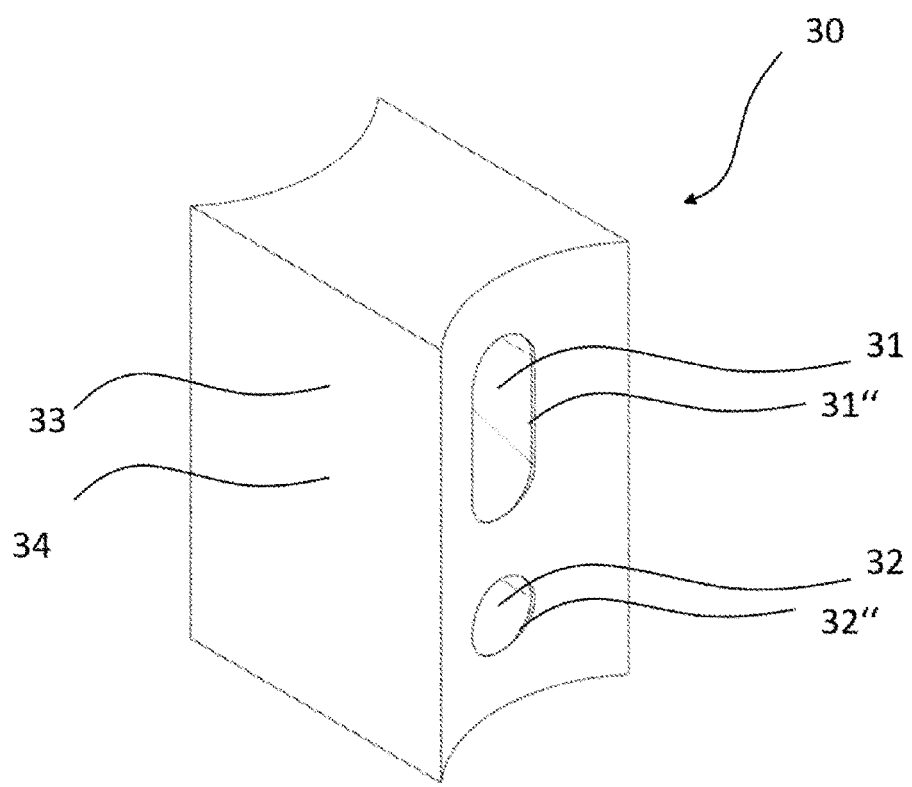
FIG. 3 is a schematic view of an example connecting element.

FIG. 3 schematically shows an illustration of a connecting element 30 according to one embodiment of the present invention. The connecting element 30 comprises a wall 33 with a sheet-metal component 34, and a first and a second duct 31, 32, which each extend from one side of the connecting element 30 to the opposite side. The first duct 31 comprises a first end region 31' and a second end region 31" on the opposite side. The second duct 32 comprises a further first end region 32' and a further second end region 32" on the opposite side. In the present embodiment, the illustrated further second end region 32" is formed in a circular manner and the second end region 31" is formed in an oval manner.

Figure 4:
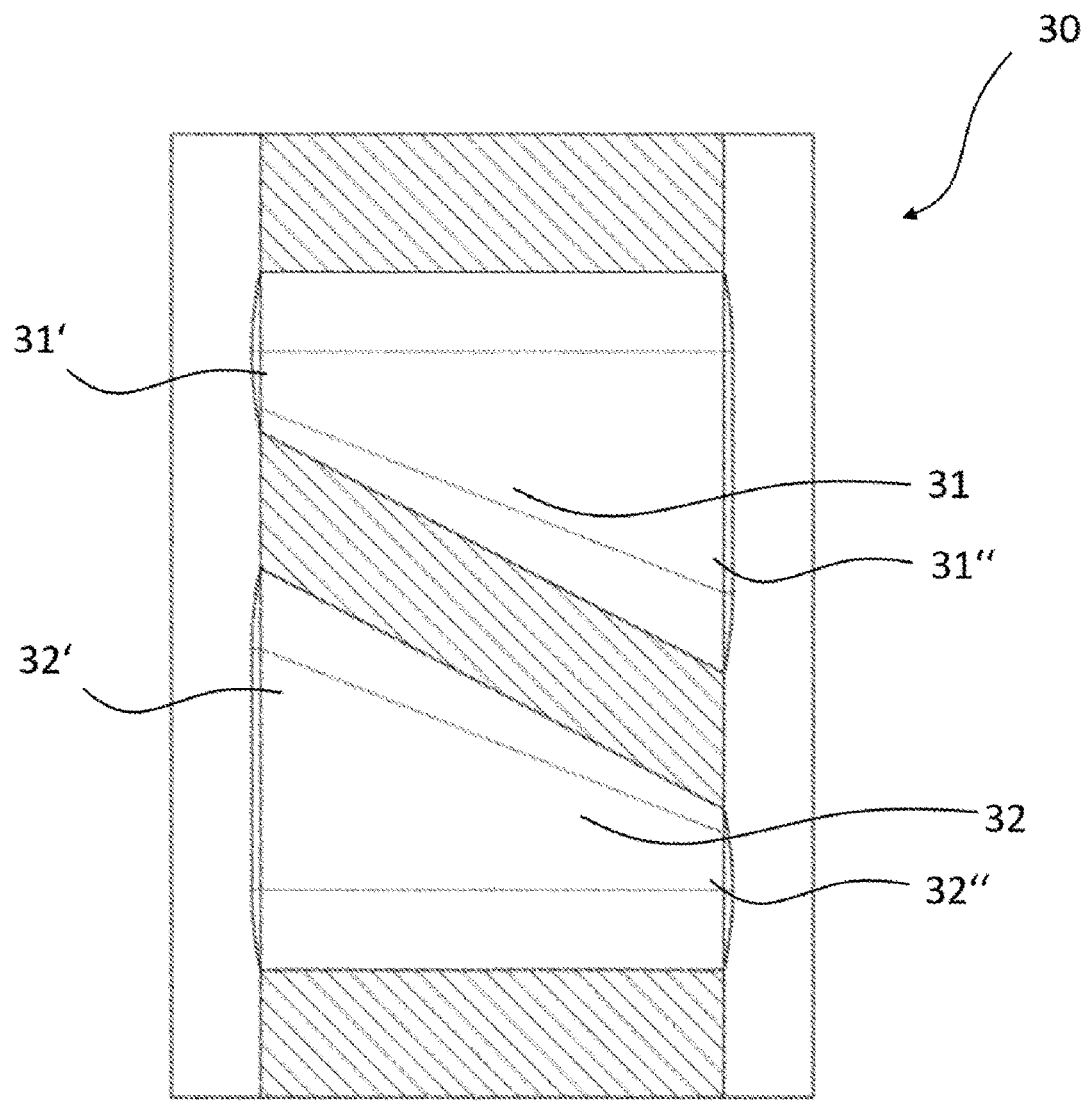
FIG. 4 is a schematic cross-sectional view of an example connecting element.

FIG. 4 schematically shows a cross-sectional illustration of a connecting element 30 according to one embodiment of the present invention. The first duct 31 comprises a first end region 31' and a second end region 31" on the opposite side. The second duct 32 comprises a further first end region 32' and a further second end region 32" on the opposite side.

LIST OF REFERENCE SIGNS

1 Damper device
10 Damper tube
11 Outer wall
12 First passage opening
13 Further first passage opening
20 Backpack valve arrangement
21 Backpack housing
22 Second passage opening
23 Further second passage opening
30 Connecting element
31 First duct
31' First end region
31" Second end region
32 Second duct
32' Further first end region
32" Further second end region
33 Wall
34 Sheet-metal component
100 Direction of the main extension axis

What is claimed is:

1. A damper device comprising:
a damper tube with an outer wall with a first passage opening;
a backpack valve arrangement;
a backpack housing in which the backpack valve arrangement is disposed, wherein the backpack housing includes a second passage opening; and
a connecting element with a first duct, wherein the first and second passage openings are connected via the first duct of the connecting element, and wherein the first duct includes a first end region and a second end region, and wherein the first end region and the second end region are different shapes;
wherein the first end region is connected to the first passage opening, and wherein the second end region is connected to the second passage opening, wherein the first end region is circular and the second end region is oval-shaped.

2. The damper device of claim 1 wherein the damper tube has a main extension axis, wherein the first and second passage openings are offset from one another in a direction of the main extension axis.

3. The damper device of claim 1 wherein the connecting element is formed separately from and non-integral with the damper tube, wherein the connecting element is formed separately from and non-integral with the backpack housing.

4. The damper device of claim 1 wherein the outer wall includes a third passage opening, wherein the backpack housing includes a fourth passage opening, wherein the third and fourth passage openings are connected via a second duct of the connecting element.

5. The damper device of claim 4 wherein the third passage opening and the fourth passage opening are disposed offset from one another in the direction of the main extension axis of the damper tube.

6. The damper device of claim 4 wherein the first and third passage openings exhibit a first spacing in the direction of the main extension axis, wherein the second and fourth passage openings exhibit a second spacing in the direction of the main extension axis, wherein the first and second spacings are the same size.

7. The damper device of claim 4 wherein the damper tube comprises:
   a piston that is movable in and out; and
   a first and a second working chamber, wherein the first passage opening is disposed at the first working chamber, wherein the third passage opening is disposed at the second working chamber.

8. The damper device of claim 4 wherein the backpack housing comprises a first hydraulic chamber and a second hydraulic chamber, wherein the second passage opening is disposed at the first hydraulic chamber and the fourth passage opening is disposed at the second hydraulic chamber.

9. The damper device of claim 1 wherein the first duct is configured to deflect a first hydraulic flow, wherein the second duct is configured to deflect a second hydraulic flow.

10. The damper device of claim 1 wherein the connecting element includes a wall that comprises sheet metal.

11. A damper device comprising:
   a damper tube with an outer wall with a first passage opening;
   a backpack valve arrangement;
   a backpack housing in which the backpack valve arrangement is disposed, wherein the backpack housing includes a second passage opening; and
   a connecting element with a first duct, wherein the first and second passage openings are connected via the first duct of the connecting element, and wherein the first duct includes a first end region and a second end region, and wherein the first end region and the second end region are different shapes;
   wherein the outer wall includes a third passage opening, wherein the backpack housing includes a fourth passage opening, wherein the third and fourth passage openings are connected via a second duct of the connecting element;
   wherein the second duct has a first end region that is connected to the third passage opening, wherein the second duct has a second end region that is connected to the fourth passage opening, wherein the second end region is circular and the first end region is oval-shaped.

12. The damper device of claim 11 wherein the damper tube has a main extension axis, wherein the first and second passage openings are offset from one another in a direction of the main extension axis.

13. The damper device of claim 11 wherein the connecting element is formed separately from and non-integral with the damper tube, wherein the connecting element is formed separately from and non-integral with the backpack housing.

14. The damper device of claim 11 wherein the third passage opening and the fourth passage opening are disposed offset from one another in the direction of the main extension axis of the damper tube.

15. The damper device of claim 11 wherein the first and third passage openings exhibit a first spacing in the direction of the main extension axis, wherein the second and fourth passage openings exhibit a second spacing in the direction of the main extension axis, wherein the first and second spacings are the same size.

16. The damper device of claim 11 wherein the damper tube comprises:
   a piston that is movable in and out; and
   a first and a second working chamber, wherein the first passage opening is disposed at the first working chamber, wherein the third passage opening is disposed at the second working chamber.

17. The damper device of claim 11 wherein the backpack housing comprises a first hydraulic chamber and a second hydraulic chamber, wherein the second passage opening is disposed at the first hydraulic chamber and the fourth passage opening is disposed at the second hydraulic chamber.

18. The damper device of claim 11 wherein the first duct is configured to deflect a first hydraulic flow, wherein the second duct is configured to deflect a second hydraulic flow.

19. The damper device of claim 11 wherein the connecting element includes a wall that comprises sheet metal.

* * * * *